(12) United States Patent
Bitar et al.

(10) Patent No.: US 6,714,960 B1
(45) Date of Patent: *Mar. 30, 2004

(54) EARNINGS-BASED TIME-SHARE SCHEDULING

(75) Inventors: Nawaf K. Bitar, San Jose, CA (US); Robert M. English, Menlo Park, CA (US); Rajagopal Ananthanarayanan, Sunnyvale, CA (US)

(73) Assignee: Silicon Graphics, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1050 days.

(21) Appl. No.: 08/752,909

(22) Filed: Nov. 20, 1996

(51) Int. Cl.[7] .................................................. G06F 9/00
(52) U.S. Cl. ..................................................... 709/103
(58) Field of Search ................................. 395/672, 673, 395/674, 677; 709/102, 103, 104, 107

(56) References Cited

U.S. PATENT DOCUMENTS

| | | | | |
|---|---|---|---|---|
| 4,432,051 A | * | 2/1984 | Bogaert et al. ............. | 364/200 |
| 4,481,583 A | * | 11/1984 | Mueller ....................... | 364/300 |
| 4,495,570 A | * | 1/1985 | Kitajima et al. ............. | 364/200 |
| 4,642,756 A | * | 2/1987 | Sherrod ....................... | 364/200 |
| 5,247,677 A | * | 9/1993 | Welland et al. ............. | 395/650 |
| 5,287,508 A | * | 2/1994 | Hejna, Jr. et al. ........... | 395/650 |
| 5,317,738 A | * | 5/1994 | Cochcroft, Jr. et al. ..... | 395/650 |
| 5,442,730 A | * | 8/1995 | Bigus .......................... | 395/22 |
| 5,600,822 A | * | 2/1997 | Grice et al. ................. | 395/500 |
| 5,628,013 A | * | 5/1997 | Anderson et al. ........... | 395/677 |

OTHER PUBLICATIONS

J. Regnier, et al, "Average Waiting Time Assignment—Part I: The Single Link Case", IEEE, vol. 38, No. 11, pp. 2049–2059, Nov. 1990.*

J. Regnier, et al "Average Waiting Time Assignment—Part II: The Integrated Services Network Case", IEEE, vol. 38, No. 11, pp. 2060–2072, Nov. 1990.*

* cited by examiner

*Primary Examiner*—Sue Lao
(74) *Attorney, Agent, or Firm*—Schwegman, Lundberg, Woessner & Kluth, P.A.

(57) ABSTRACT

A precise earnings-based time-share scheduler schedules multiple jobs in a computer system by apportioning earnings, at scheduler ticks. Earnings are apportioned to jobs based on actual time a job spent in a queue requesting execution on a central processing unit (CPU) in the computer system between scheduler ticks and amounts of time jobs ran on the CPU between scheduler ticks. At the end of a time slice, a job is selected for execution on the processor based on earnings apportioned to each job.

38 Claims, 8 Drawing Sheets

EARNINGS-BASED TIME-SHARE SCHEDULING

THE FIELD OF THE INVENTION

The present invention relates generally to computer systems, and in particular to time-share scheduling performed by computer operating systems.

BACKGROUND OF THE INVENTION

A variety of time-share scheduling schemes have been employed in computer systems to schedule time-share jobs competing for execution time on one or more central processing units (CPUs). Typically, these time-share scheduling schemes alter or adjust priorities in an attempt to achieve fairness. For example, in one such time-share scheduling scheme, referred to as a priority aging algorithm, a particular job starts with a priority in a middle range of priority values. As a selected job executes on a CPU, the selected job's priority is decreased to make the job less attractive for future execution. Conversely, as a non-serviced job waits for CPU execution time, the priority of the non-serviced job improves to make the non-serviced job more attractive for future execution.

The priority aging algorithm operates well so long as the algorithm is confined to being based strictly on the priorities. Operating systems, however, typically take advantage of conditions such as cache affinity, memory affinity, and interactive response of certain jobs. These other conditions are most likely not related to the priorities assigned by the aging algorithm. Thus, to respond to these other conditions, the aging algorithm is violated, for example, to take advantage of a warm cache being used by a low priority job, which would otherwise cool down if the low priority job stayed away from the warm cache.

In order to take advantage of conditions such as cache affinity, memory affinity, and interactive response, operating systems operating with an aging algorithm typically reset a job's priority to a relatively high priority value to assure that the job gets to run on the CPU. Because of the high priority assigned to the job, the job typically ends up with an overabundance or unfair amount of CPU time.

Another previous time-share scheduling scheme is based on a market model, where each job earns some amount of CPU time which is placed in a bank account. An auction is held and each job pays so much for CPU time or I/O time from the bank account. In this system, the job which bids the most gets to run on the CPU. This economic model has proved to be far too complex to practically implement in a commercial computer system. Such complexities include needing to calculate how much a particular job wants to spend, how much the job should reserve for future bidding, and other such complex factors needed to resolve the auction issues.

Another previous time-share scheduling scheme is a credit time-share algorithm, which involves a credit for CPU time based on a multiprocessor CPU system. A job is determined to be entitled to a selected number of CPUs of the multiprocessor system based on the job's priority. If the job uses only a portion of the selected number of CPUs entitled to the job, the job acquires the unused portion as credits it can spend at a later time to get additional CPUs for execution.

Yet another previous time-share scheduling scheme is referred to as lottery scheduling. Lottery scheduling represents a randomized resource allocation mechanism. Resource rights of jobs are represented by lottery tickets. Each allocation of CPU (or I/O) resources is determined by holding a lottery. The CPU resource is granted to the job with the winning ticket. In this way, CPU resources should be allocated to competing jobs in proportion to the number of tickets held by each job. A job is awarded some number of tickets based on the job's priority. Nevertheless, just as with the time-share aging algorithm, lottery scheduling relies on a mathematical model which is necessarily broken when the operating system places jobs in for execution based on factors or conditions other than those associated with the statistical model, such as cache affinity, memory affinity, and interactive response.

Therefore, for the reasons stated above, and for other reasons presented in greater detail in the Description of the Preferred Embodiments section of the present specification, there is a need for a time-share scheduling scheme which permits factors or conditions such as cache affinity, memory affinity, and interactive response to be used for scheduling without breaking the basic mathematical model of the scheduling scheme. In addition, there is a need for an improved time-share scheduling scheme which provides a precise method of achieving an accurate and fair assignment of time-share jobs over a long-term period, and at the same time, provides significant leeway in short-term scheduling decisions.

SUMMARY OF THE INVENTION

The present invention provides a method and a computer system having a time-share scheduling mechanism for scheduling multiple jobs in a computer system. Earnings are apportioned to each of certain jobs of the multiple jobs based on time each of the certain jobs spent in a queue requesting execution on a processor in the computer system and time each of the certain jobs ran on the processor. At the end of a time slice, a job is selected for execution on the processor based on earnings apportioned to each of the certain jobs.

In one embodiment of the present invention, earnings are allocated at times defined as scheduler ticks. At scheduler ticks, earnings are allocated to each of the certain jobs based on time each of the certain jobs spent in a queue requesting execution on a processor in the computer system. Earnings are subtracted from at least one of the certain jobs as the at least one of the certain jobs runs on the processor. Earnings are preferably allocated, at scheduler ticks, to each of the certain jobs proportional to priority weights assigned to each of the certain jobs.

In one embodiment of the present invention, a balance is calculated, at the start of each scheduler tick. The balance represents an amount of time available for running jobs in the processor over a previous period between scheduler ticks. At the end of scheduler ticks, earnings are allocated to each of the certain jobs based on the calculated balance and time each of the certain jobs spent in a queue requesting execution on a processor in the computer system over the previous period between scheduler ticks. The balance is preferably calculated, at the start of scheduler ticks, by summing all total earnings of the certain jobs. After the earnings are allocated, at the end of scheduler ticks, based on the calculated balance, the summation of all total earnings of the certain jobs is preferably substantially equal to zero.

In one embodiment of the present invention, the allocated earnings are calculated for a given job of the certain jobs substantially equal to minus balance multiplied by the given job's time spent in a queue requesting execution on a processor in the computer system over a previous period between scheduler ticks multiplied by the given job's priority weight divided by the summation of all of the certain jobs time spent in a queue requesting execution on a processor in the computer system over a previous period between scheduler ticks multiplied by the their corresponding priority weights.

In one embodiment of the present invention, earnings are preferably only apportioned to certain jobs which are runnable on the processor. In other embodiment of the present invention, earnings are apportioned to all jobs in the computer system. In addition, the earnings of each of the certain jobs is preferably limited to a maximum earnings value to avoid unbounded accumulation of time.

The time-share scheduling mechanism of the present invention preferably schedules jobs for execution on the processor based on conditions other than the selected jobs earnings, such as cache affinity of the selected job, the memory affinity of the selected job, and the interactive response of the selected job. The earnings are preferably not altered to schedule the selected job, but are decreased as the job runs on the processor.

The earning-based time-share scheduler of the present invention provides long-term stability by assuring that each job gets its fixed share of the CPU over time. Many conditions other than earnings of a job are taken into account when selecting a process to run on the CPU, such as cache affinity, memory affinity, and interactive response. While such short-term decisions may prevent a job from being run, the short-term decisions do not affect a job's time-accumulation rate, which eventually dominates and forces the scheduler to give the job its fair share of the CPU. Therefore, the earning-based time-share scheduling mechanism of the present invention permits considerable flexibility in short-term scheduling decisions in order to improve throughput or response time, while maintaining fairness over the long term.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Overview of Scheduler Architecture

Figure 1:
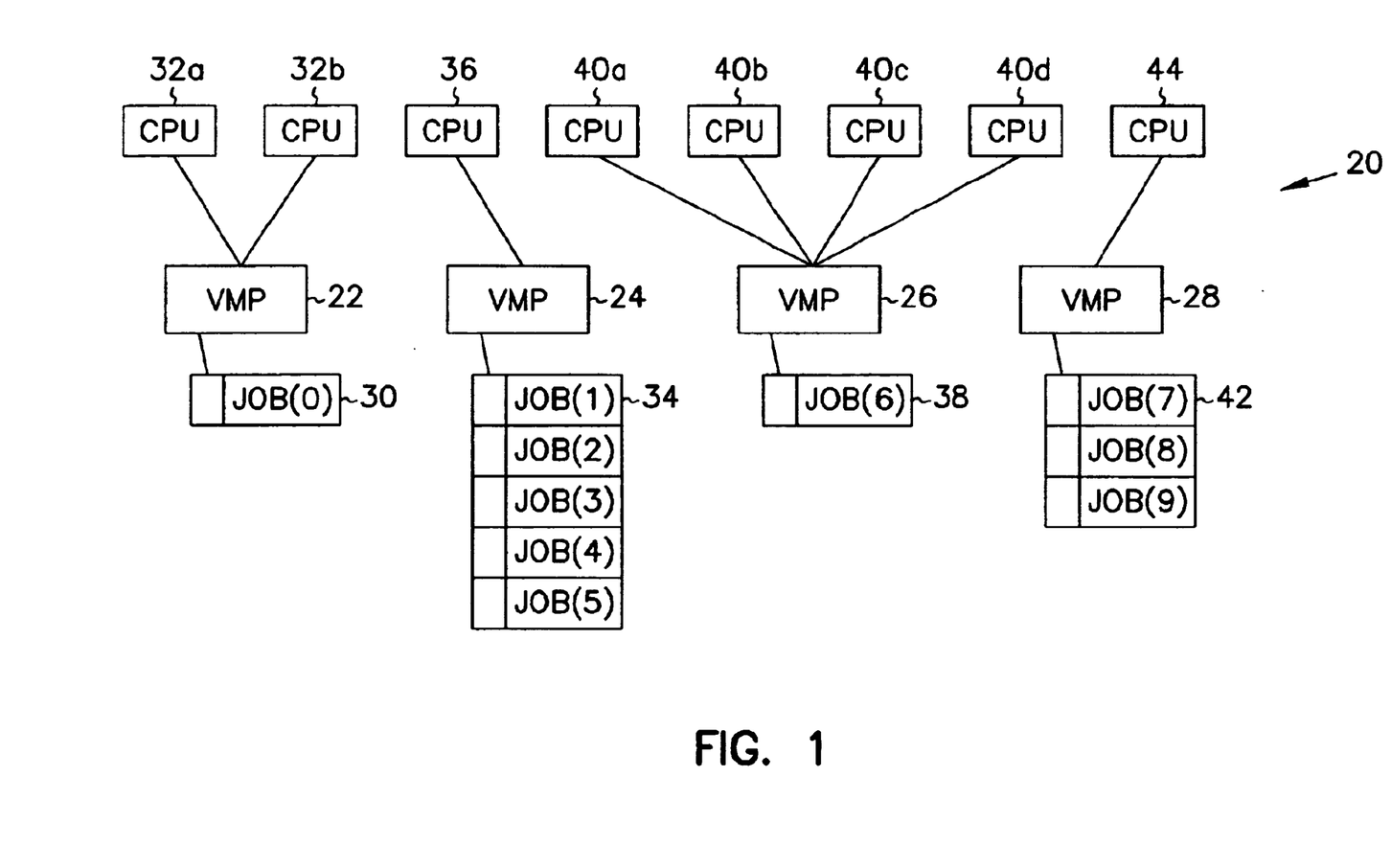
FIG. 1 is a block diagram of a multiprocessor computer system employing an earnings-based time-share scheduling scheme according to the present invention.

A multiprocessor computing system employing a scheduler architecture according to the present invention is illustrated generally at 20 in FIG. 1. Multiprocessor computer system 20 includes four virtual multiprocessor (VMP) units indicated at 22, 24, 26, and 28. A VMP is the primary unit of central processing unit (CPU) allocation. Each VMP includes a queue of runnable jobs and a set of CPUs. For example, VMP 22 includes a VMP queue 30 including a job(0) and CPUs 32a and 32b. VMP 24 includes a queue 34 having five jobs (job (1)–job (5)) and a CPU 36. VMP 26 includes a queue 38 having a job(6) and four CPUs 40a–40d. VMP 28 includes a queue 40 having three jobs (job (7)–job (9)) and a CPU 44. Each VMP also includes a number of status and statistical variables used to distribute CPU usage among processes.

In the scheduler architecture depicted for multiprocessor computer system 20 in FIG. 1, one of either the queue or the CPU associated with a VMP is a singleton. In other words, in this one embodiment, multiprocessing jobs always have a dedicated VMP and a time-shared VMP only runs single-threaded jobs. In addition, an active VMP includes at least one CPU. Thus, this embodiment of multiprocessor computer system 20 never includes more VMPs than CPUs.

Each job is represented by a job structure which includes all the necessary variables used to maintain its corresponding process. Multiple threads in the process share this job structure, such that any accounting and apportioning for the multiple threads can be accomplished by considering the multiple threads as a single logical unit represented by the job.

In addition to VMP-based scheduling, each CPU supports a queue of must-run jobs which of necessity should be executed only on that CPU due to hardware or software constraints local to that CPU. For example, the graphics hardware in a multiprocessor is optionally accessible only from a certain CPU. Must-run jobs are optionally subject to the below described earnings based accounting according to the present invention. Must-run jobs are, however, only available to the must-run CPU for selection to execute, because other CPUs cannot select must-run jobs.

Further, the multiprocessor system 20 alternatively supports pure priority based scheduling, not generally used for time-share jobs but to support real-time jobs. When a real-time job is scheduled onto a CPU, the CPU becomes temporarily unavailable to its parent VMP.

Time-Share Scheduling

The time-share scheduler of the present invention allocates time to each job and runs jobs in order of allocated time. Each time a job runs, the job is charged for its run time. This is unlike conventional time-sharing schedulers which schedule jobs by priority and manipulate the priority of time-sharing processes to achieve fairness.

Time-sharing allocations according to the present invention are based on a currency or economic model. Each time-sharing user is assigned a weight, which is shared by the processes generated by that user. For example, in a mass allocation scheme, each logged-in user is assigned a weight, and each job generated by a user receives a fraction of the assigned weight.

Figure 2:
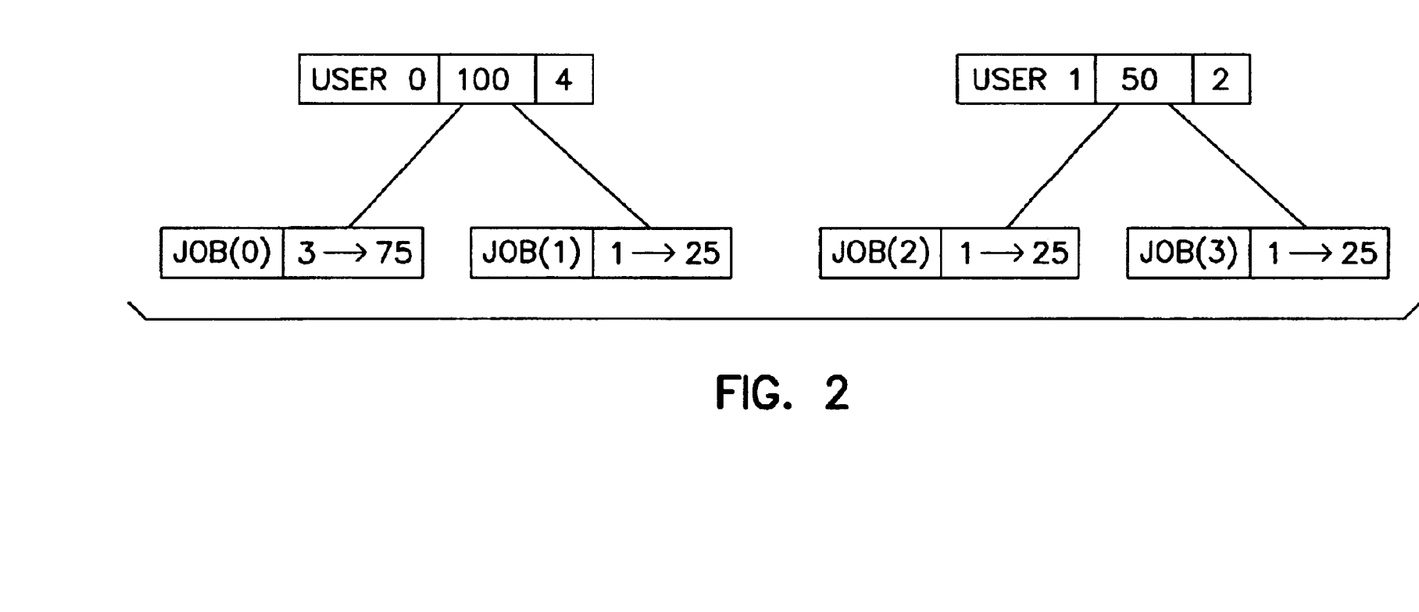
FIG. 2 is a diagram illustrating a mass allocation scheme for the computer system of FIG. 1.

FIG. 2 illustrates in diagram form such a mass allocation scheme. As illustrated in FIG. 2, the total weight of User 0's jobs is 4. User 0 has accordingly assigned a weight of 3 to a job(0) and a weight of 1 to a job(l). Thus, job(0) receives 75% of user 0's allocated weight of 100 or 75, and job 1 gets 25% of User 0's allocated weight of 100 or 25. Similarly, as illustrated in FIG. 2, User 1 has a total allocated weight of 50, which is split evenly between a job(2) and job(3). Since User 0 and User 1 are time-sharing the computer system, job(0), job(1), job(2), and job(3) compete equally for CPU time. Theoretically, job(0) will receive half of the CPU time, while job(1), job(2), and job(3) will each receive one-sixth of the CPU time.

Time is allocated to processes or jobs in proportion to the job's associated weight. Users can alter the distribution of weights between their processes with a variety of system calls, such as a system call which distributes weights geometrically or through a system call which allows direct weight control. In one embodiment, a process can be allocated a weight of 0, but the multiprocessor computer system does not guarantee forward progress. The 0-weighted process can, however, absorb cycles which would otherwise have gone idle.

Earnings-Based Time-Share Scheduling

Figure 3:
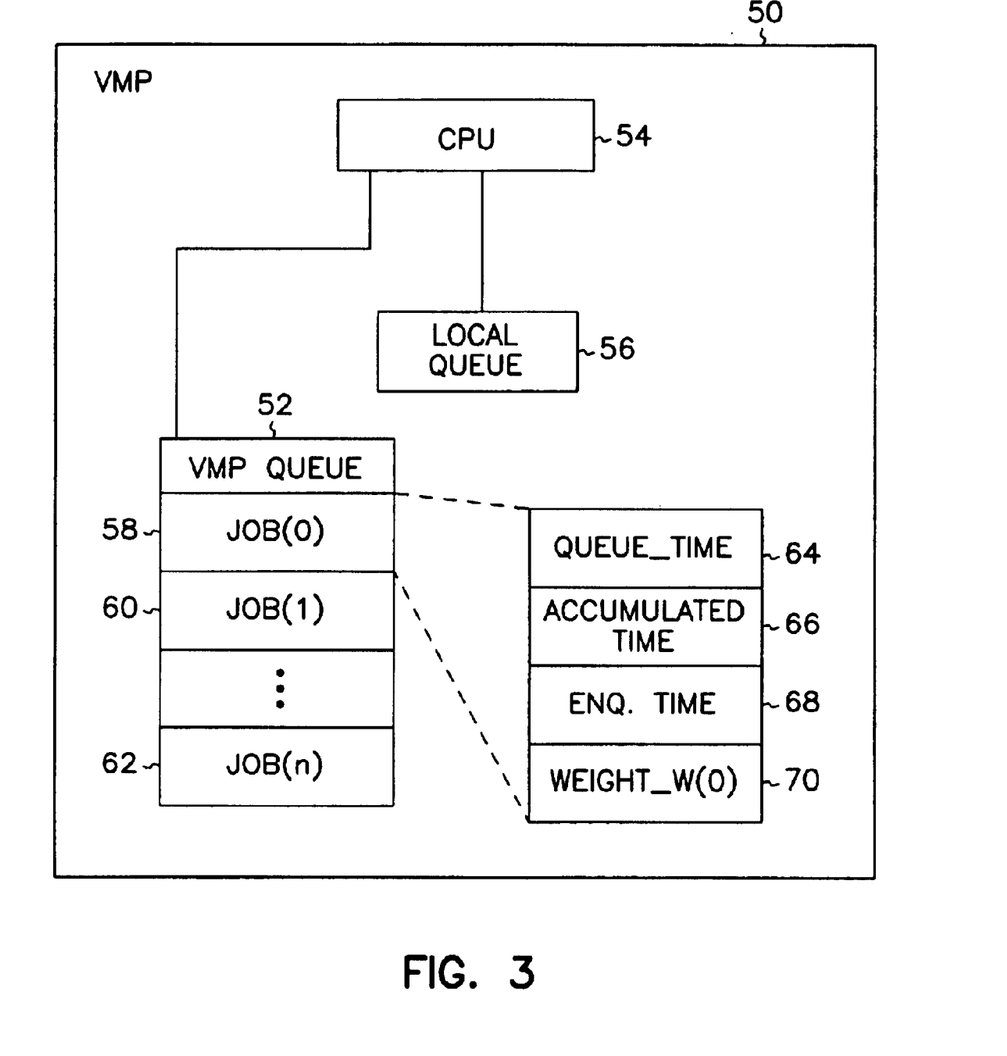
FIG. 3 is a diagram illustrating a virtual multiprocessor according to the present invention.

A more detailed diagram of a VMP 50 is illustrated in diagram form in FIG. 3. VMP 50 includes a VMP queue 52, a CPU 54, and a local queue 56. VMP queue 52 includes a job(0) indicated at 58, a job(1) indicated at 60 up to a job(n) indicated at 62. Each job includes a job structure for each process. As illustrated in FIG. 3, each job includes variables that are used to maintain the process. For example, job(0) indicated at 58 includes a queue_time variable indicated at 64, an accumulated_time variable indicated at 66, an enqueue_time variable indicated at 68, and a weight w(0) variable indicated at 70. These variables are used in the earnings-based time-share scheduling algorithm to determine the placement of the jobs in the VMP queue 52.

A basic unit of time in the earnings-based algorithm is a Scheduler Tick or Clock Tick. The Scheduler Tick is a fraction of a Time Slice. The Time Slice represents a time which a process gets to operate on the CPU. In other words, the Time Slice represents the point at which a new thread gets to run, and the old thread relinquishes the CPU. In one embodiment of the present invention, the Scheduler Tick is ten milliseconds (mS) and the Time Slice is 100 mS, but both the Scheduler Tick and the Time Slice are typically variable time values which can be manipulated by the operating system.

The queue_time represents the amount of time in the previous Scheduler Tick in which a job has been queued. The accumulated_time represents the total accumulated time earned and spent on the VMP queue. The enqueue_time represents the instant time in which the job entered on the VMP queue. The Weight (w) of a job represents the job's priority.

An Earnings of a job is the accumulated time a job has purchased and spent while on the VMP queue and is stored as the accumulated_time variable. A job spends Earnings when the job is running on the CPU.

A VMP Balance or Balance is equal to the summation of the current Earnings or accumulated_times of all jobs in the VMP queue. At the start of a Scheduler Tick, the Balance represents the time that a job can purchase and represents how much time a job could possibly have run over the previous Scheduler Tick. Because jobs are possibly enqueued or dequeued, a current value of Balance does not necessarily reflect the amount of time a job was running. In particular, a job with large Earnings, may have just joined the VMP, producing a large negative Balance, or a job with high Earnings just left the VMP, producing a large positive Balance. If the Balance is larger than normal or the Balance is negative, the effect on the relative values of the Earnings remains unchanged. Nevertheless, the absolute values do differ from a more "normal" value of Balance.

The earnings-based algorithm according to the present invention operates by first deducting the Earnings spent while running on the CPU. Then, the Balance is computed at the start of each Scheduler Tick. Once the Balance is computed, at the end of the Scheduler Tick, jobs are apportioned additional CPU time (i.e., Earnings) according to the following Equation I:

$$\text{JOB}(i) \text{ APPORTIONED EARNINGS} = -\text{BALANCE}*(\text{JOB}(i) \text{ QUEUE\_TIME}*w(i))/\Sigma (\text{QUEUE\_TIMES}*w\text{'s}) \text{ of all jobs.} \quad \text{Equation I}$$

According to the above Equation I, a job is apportioned additional Earnings based the product of the Weight (w) of the job and the queue_time of the job, or in other words, by multiplying the priority of the job by the time a job spent on the VMP queue in the previous Scheduler Tick. Typically, a job is not apportioned Earnings when it cannot run. A job is runnable only if a job is runnable on a VMP queue and the job could have run in the past Scheduler Tick. For example, it is possible that a CPU may be servicing ithreads or sthreads for the entire Scheduler Tick, thereby preventing any time-shared thread from running.

In addition to the runnable jobs in the VMP queue, blocked jobs may appear on the queue until the end of the Scheduler Tick when any apportioning that needs to be performed during the Scheduler Tick is completed. When a job is blocked, the enqueue_time is calculated according to the following Equation II:

$$\text{ENQUEUE\_TIME of blocked job}(i) = -(\text{CURRENT TIME} - \text{ENQUEUE\_TIME at previous Scheduler Tick}). \quad \text{Equation II}$$

Normally, at the start of each Scheduler Tick, the queue_time is calculated, prior to the enqueue_time being reset to the current time, according to the following Equation III:

$$\text{QUEUE\_TIME} = \text{CURRENT\_TIME} - \text{ENQUEUE\_TIME}. \quad \text{Equation III}$$

After a job is blocked, at the next start of a Scheduler Tick, the enqueue_time is first calculated according to the following Equation IV:

$$\text{ENQUEUE\_TIME of blocked job}(i) \text{ at start of next Scheduler Tick} = \text{CURRENT TIME} + \text{ENQUEUE\_TIME calculated from Equation II}. \quad \text{Equation IV}$$

Then, the queue_time is calculated with the above Equation III. At the end of the Scheduler Tick, both the queue_time and the enqueue_time are equal to zero the job is blocked and no longer queued.

In operation, the ordering imposed by the Earnings is a total order, and at the beginning of each Time Slice, the order is assumed to be correct, and a job is selected to be run on the CPU. At the end of each Scheduler Tick, Earnings are apportioned and the order on the VMP queue is corrected to reflect the actual execution behavior of the CPU since the last Scheduler Tick. The earnings-based algorithm does not spend Earnings based on the time at the head of the queue, because the time at the head of the queue does not guarantee execution, but rather actually monitors the amount of execution time in the CPU which is reflected in the VMP Balance and the Earnings.

A preferred embodiment of the earnings-based time-share scheduling algorithm assures that there is no job starvation because the Earnings are capped or limited to a Maximum Earnings value to prevent the Earnings from growing without bound.

Other Conditions Affecting Scheduling Other Than Earnings

Referring to FIG. 3, local queue 56 provides an interactive boost to certain jobs based on factors or conditions other than the Earnings or accumulated time of a job, such as cache affinity, memory affinity, and interactive response conditions. The local queue boost affects selection of a job only and does not affect the allocations of Earnings of a particular job other than that if a job is put on the CPU as a result of a local queue boost, the time on the CPU will be subtracted from the accumulated time or Earnings of the job.

In one embodiment, jobs are scheduled preferentially on VMP nodes where the job has memory affinity. When a VMP selects a process to run, the VMP inquires from the memory system whether there is another VMP node or CPU better suited to run the process. If there is a better VMP node, the VMP exchanges information with the other VMP's node's last CPU to determine whether the process can be profitably swapped.

In one embodiment, the processor's cache affinity is determined by a number of cache misses the process takes, the process's expected time until end of Time Slice or block, and a number of cache misses taken since the process last ran. When taking into account cache affinity, multiprocessor computer system 20 optionally optimizes selection of processes for CPU execution based on throughput or latency with respect to a particular process. For example, a latency optimization typically places less emphasis on cache affinity, while a throughput optimization tends to over-emphasize cache affinity to minimize link utilization.

As to interactive response, this can be used to boost a job who is just waking up, holding a lock in the kernel, which is typically what the job is doing when it is interactive. If a job is holding a critical resource or system-wide resource, such as a memory allocator, then that job can be placed on a CPU to free up the critical or system-wide resource.

Previous time-share scheduling algorithms also needed to provide boosts to certain conditioned jobs based on such conditions as cache affinity and interactive response. Nonetheless, in conventional computer systems, such as those using aging algorithms, there is no long-term history maintained, rather the priority of a boosted job was increased and that job got a disproportionate amount of service time over a long term. By contrast, the earnings-based algorithm of the present invention maintains the Earnings with the accumulated time variable, which is not changed when a interactive boost is provided from the local queue, except that the selected job is charged when it actually runs on the CPU. In other words, in the previous time-schedulers, a boosted job basically gets its bank account or priority reset to a high priority value causing time-share history for that job to be lost. Conversely, the earning-based time-share scheduling algorithm of the present invention provides a short-term interactive boost yet maintains a long-term history based on the Earnings of the job.

Therefore, the earnings-based time-share scheduling of the present invention provides a low-overhead, precise, scalable, and distributed scheduling model. The earnings based scheduling provides flexibility in making short-term scheduling decisions and maintains long-term stability or fairness because the Earnings eventually dominate.

Detailed Example of Earnings-Based Time-Share Scheduling

A detailed timing example of the earning-based time-share scheduling of the present invention, as implemented by the operating system of multiprocessor computer system 20, is illustrated in timing diagram form in FIGS. 4A–4E. In this example, the Scheduler Ticks are spaced 10 mS intervals, and the Time Slice is 30 mS.

Figure 4A:
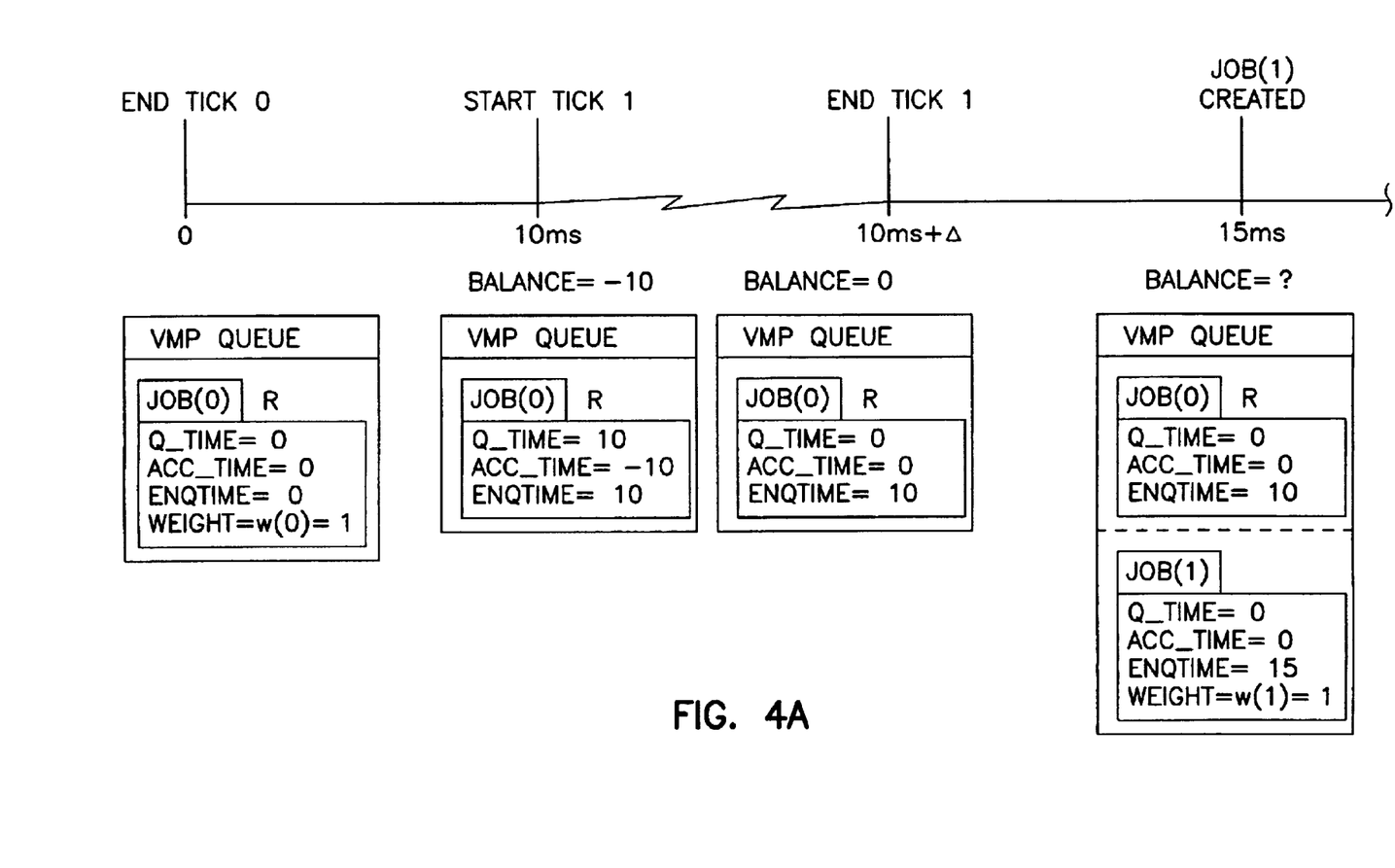
FIGS. 4A–4E together form a timing diagram illustrating a detailed timing example of the earning-based time-share scheduling of the present invention as implemented by the operating system of the multiprocessor computer system of FIG. 1.

At time 0 mS, a new job(0) structure is created and placed on the VMP. Job(0) starts running with the following variable values in the VMP queue: queue_time=0 mS; accumulated_time=0 mS; enqueue_time=0 mS; and weight w(0)=1.

At the start of Scheduler Tick 1, at time 10 mS, the VMP Balance=−10 mS, and the job(0) variable values are: queue_time=10 mS; accumulated_time=−10 mS; and enqueue_time=10 mS. At this point, only job(0) is on the VMP queue. At the end of the Scheduler Tick 1 slightly after time 10 mS, 10 mS of Earnings are apportioned to Job(0) based on the above Apportioning Equation I. As a result, at the end of Scheduler Tick 1, the VMP Balance=0 mS, and the job(0) variable values are: queue_time 0 mS; accumulated_time=0 mS; and enqueue_time=10 mS.

At time 15 mS, a new job(1) structure is created and placed on the VMP. At time 15 mS, the VMP Balance is unknown, and the job(0) variable values are: queue_time=0 mS; accumulated_time=0 mS; and enqueue_time=10 mS. The newly created job(1) enters on the VMP Queue with the following variable values in the VMP queue: queue_time=0 mS; accumulated_time=0 mS; enqueue_time=15 mS; and weight w(1)=1.

At the start of Scheduler Tick 2, at time 20 mS, the VMP Balance=−10 mS. The job(0) variable values are: queue_time=10 mS; accumulated_time=−10 mS; and enqueue_time=20 mS. The job(1) variable values are: queue_time=5 mS; accumulated_time=0 mS; and enqueue_time=20 mS. At the end of the Scheduler Tick 2 slightly after time 20 mS, 7 mS of Earnings are apportioned to Job(0) and 3 mS of Earnings are apportioned to Job(1) based on the above Apportioning Equation I. As a result, at the end of Scheduler Tick 2, the VMP Balance=0 mS. The job(0) variable values are: queue_time=0 mS; accumulated_time=−3 mS; and enqueue_time=20 mS. The job(1) variable values are: queue_time=0 mS; accumulated_time=3 mS; and enqueue_time=20 mS.

Figure 4B:
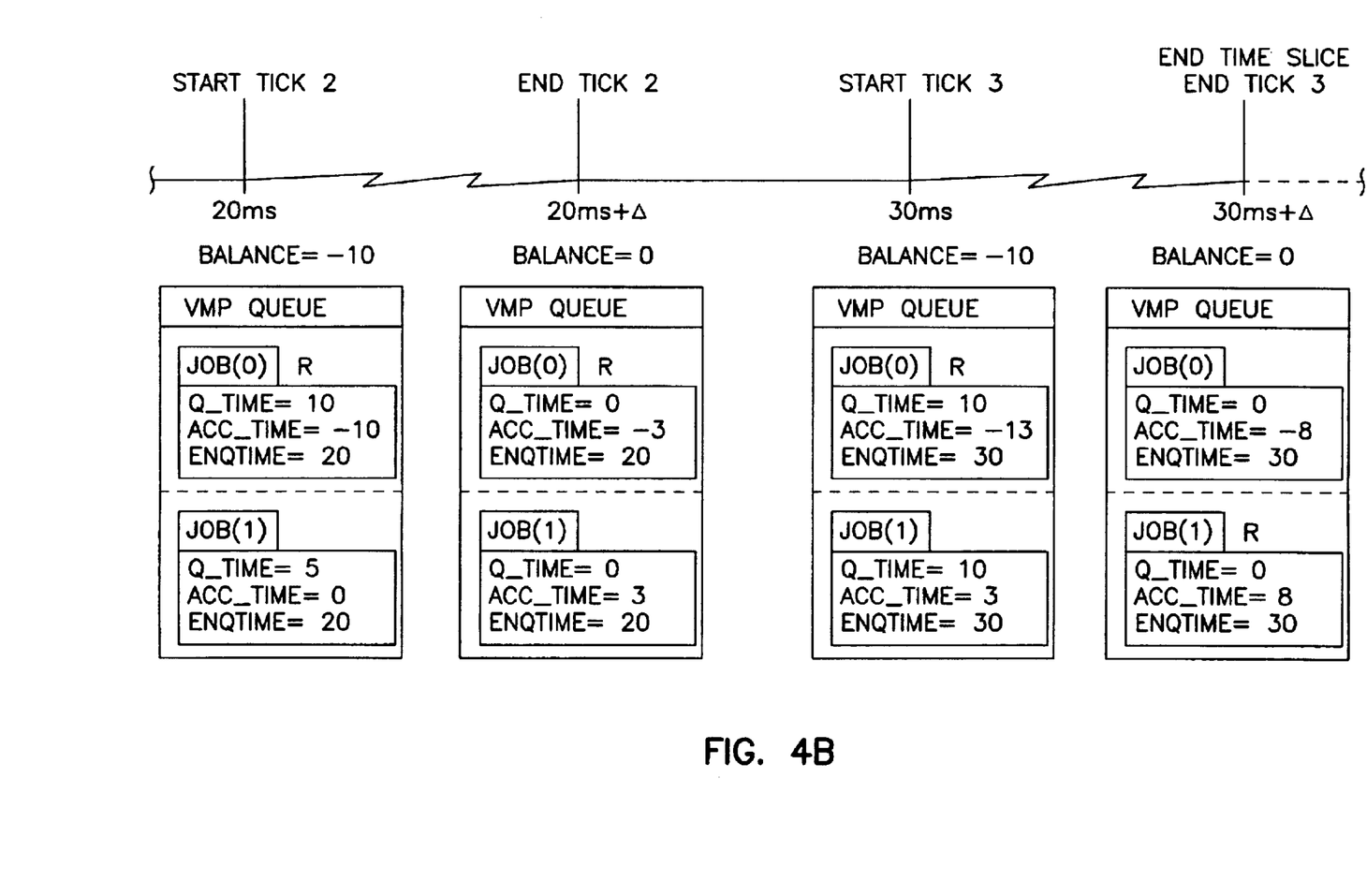

At the start of Scheduler Tick 3, at time 30 mS, the VMP Balance=−10 mS. The job(0) variable values are: queue_time=10 mS; accumulated_time=−13 mS; and enqueue_time=30 mS. The job(1) variable values are: queue_time=10 mS; accumulated_time=3 mS; and enqueue_time=30 mS. At the end of the Scheduler Tick 3 slightly after time 30 mS, 5 mS of Earnings are apportioned to Job(0) and 5 mS of Earnings are apportioned to Job(1) based on the above Apportioning Equation I. As a result, at the end of Scheduler Tick 3, the VMP Balance=0 mS. The job(0) variable values are: queue_time=0 mS; accumulated_time=−8 mS; and enqueue_time=30 mS. The job(1) variable values are: queue_time=0 mS; accumulated_time=8 mS; and enqueue_time=30 mS.

Also at time 30 mS+delta, at the end of Scheduler Tick 3, the Time Slice, which began at 0 mS when job(0) was placed on the CPU, ends 30 mS after the beginning of the Time Slice. At the end of the Time Slice, job(1) is at the top of the VMP queue with an accumulated_time=8 mS and job(0) is at the bottom of the VMP queue with an accumulated_time=−8 mS. Thus, job(1) is switched to run on the CPU.

At time 35 mS, which is not at a Scheduler Tick, Job(1) is blocked, and Job(0) is switched to run on the CPU. At time 35 ms, the VMP Balance is unknown, and the job(0) variable values are: queue_time=0 mS; accumulated_time=−8 mS; and enqueue_time=30 mS. The job(1) variable values are: queue_time=0 mS; accumulated_time=3 mS; and enqueue_time=−5 mS. The job(1) enqueue_time is calculated according the above Equation II for when a job is blocked.

Figure 4C:
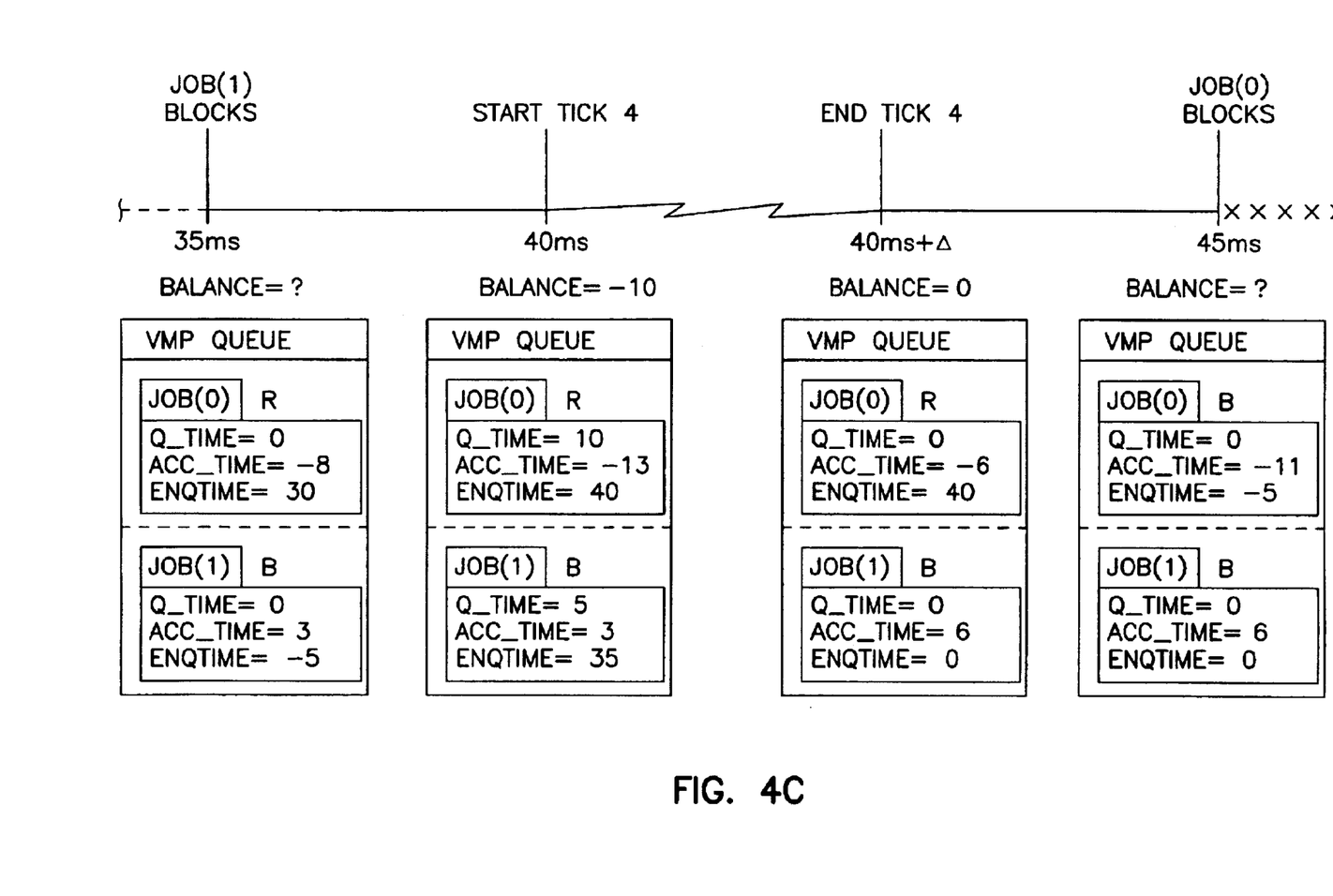

At the start of Scheduler Tick 4, at time 40 mS, the VMP Balance=−10 mS. The job(0) variable values are: queue_ time=10 mS; accumulated_time=–13 mS; and enqueue_time=40 mS. The job(1) variable values are: queue_time=5 mS; accumulated_time=3 mS; and enqueue_time=35 mS. The job(1) enqueue_time being calculated according to the above Equation IV. At the end of the Scheduler Tick 4 slightly after time 40 mS, 7 mS of Earnings are apportioned to Job(0) and 3 mS of Earnings are apportioned to Job(1) based on the above Apportioning Equation I. As a result, at the end of Scheduler Tick 4, the VMP Balance=0 mS. The job(0) variable values are: queue_time=0 mS; accumulated_time=–6 mS; and enqueue_time=40 mS. The job(1) variable values are: queue_time=0 mS; accumulated_time=6 mS; and enqueue_time=0 mS.

At time 45 mS, which is not at a Scheduler Tick, both Job(0) and Job(1) are blocked, and therefore, no job is running on the CPU. At time 45 mS, the VMP Balance is unknown, and the job(0) variable values are: queue_time=0 mS; accumulated_time=–11 mS; and enqueue_time=–5 mS. The job(0) enqueue_time is calculated according the above Equation II for when a job is blocked. The job(1) variable values are: queue_time 0 mS; accumulated_time=6 mS; and enqueue_time=0 mS.

At the start of Scheduler Tick 5, at time 50 mS, the VMP Balance=–5 mS. The job(0) variable values are: queue_time=5 mS; accumulated_time=–11 mS; and enqueue_time=45 mS. The job(0) enqueue_time being calculated according to the above Equation IV. The job(1) variable values are: queue_time=0 mS; accumulated_time=6 mS; and enqueue_time=0 mS. At the end of the Scheduler Tick 4 slightly after time 40 mS, 5 mS of Earnings are apportioned to Job(0) and 0 mS of Earnings are apportioned to Job(1) based on the above Apportioning Equation I. As a result, at the end of Scheduler Tick 5, no job is running on the CPU and the VMP Balance=0 mS. The job(0) variable values are: queue_time=0 mS; accumulated_time=–6 mS; and enqueue_time=0 mS. The job(1) variable values are: queue_time=0 mS; accumulated_time=6 mS; and enqueue_time=0 mS.

Figure 4D:
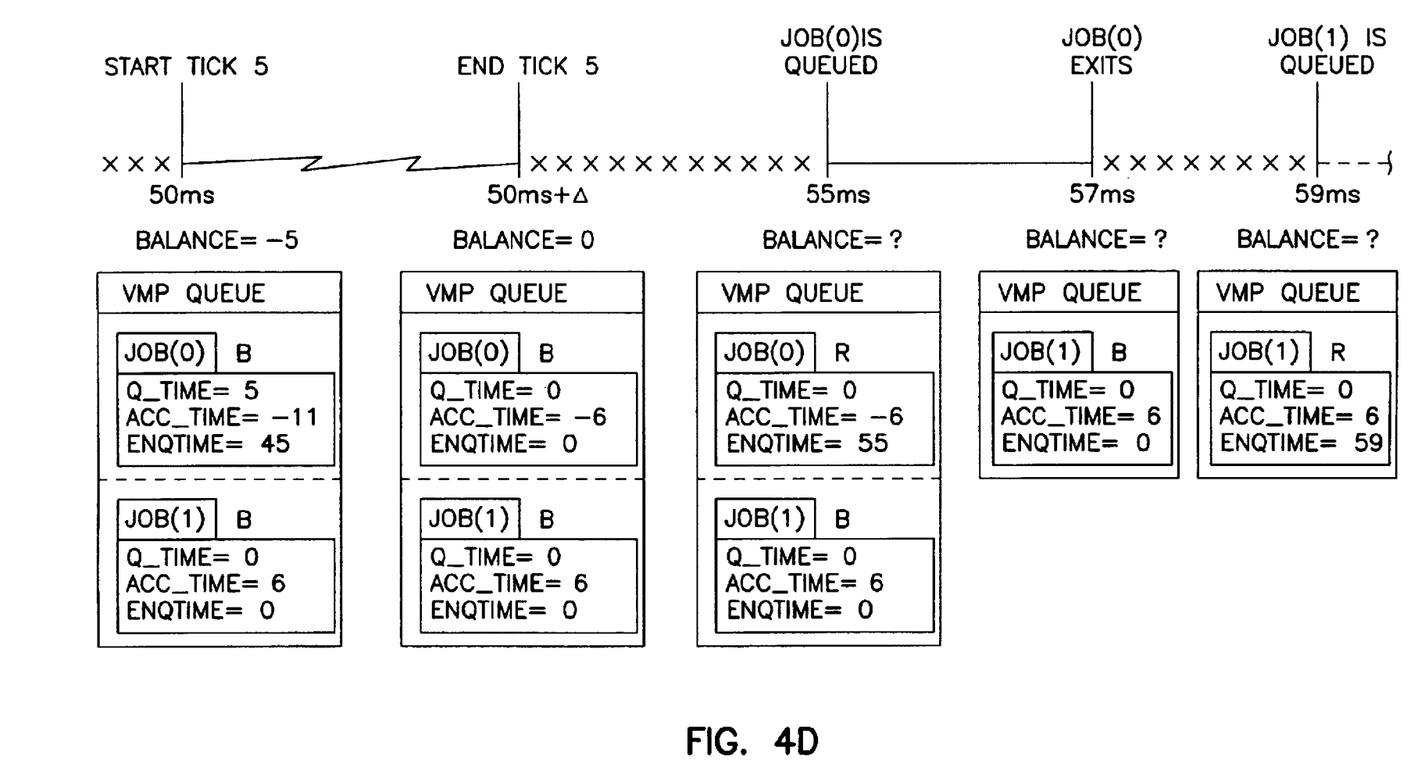

At time 55 mS, which is not at a Scheduler Tick, Job(0) is queued and starts running on the CPU. At time 55 mS, the VMP Balance is unknown, and the job(0) variable values are: queue_time=0 mS; accumulated_time=–6 mS; and enqueue_time=55 mS. The job(1) variable values remain at: queue_time=0 mS; accumulated_time=6 mS; and enqueue_time=0 mS.

At time 57 mS, which is not at a Scheduler Tick, Job(0) exits the VMP, and therefore, no job is running on the CPU. At time 57 mS, the VMP Balance is unknown, and the job(1) variable values remain at: queue_time=0 mS; accumulated_time=6 mS; and enqueue_time=0 mS.

At time 59 mS, which is not at a Scheduler Tick, Job(1) is queued and starts running on the CPU. At time 57 mS, the VMP Balance is unknown, and the job(1) variable values are: queue_time=0 mS; accumulated_time=6 mS; and enqueue_time=59 mS.

At the start of Scheduler Tick 6, at time 50 mS, the VMP Balance=5 mS. The job(1) variable values are: queue_time=1 mS; accumulated_time=5 mS; and enqueue_time=60 mS. At the end of the Scheduler Tick 6 slightly after time 60 mS, –5 mS of Earnings are apportioned to Job(1) based on the above Apportioning Equation I. As a result, at the end of Scheduler Tick 5, the VMP Balance=0 mS. The job(1) variable values are: queue_time=0 mS; accumulated_time=0 mS; and enqueue_time=60 mS.

Figure 4E:
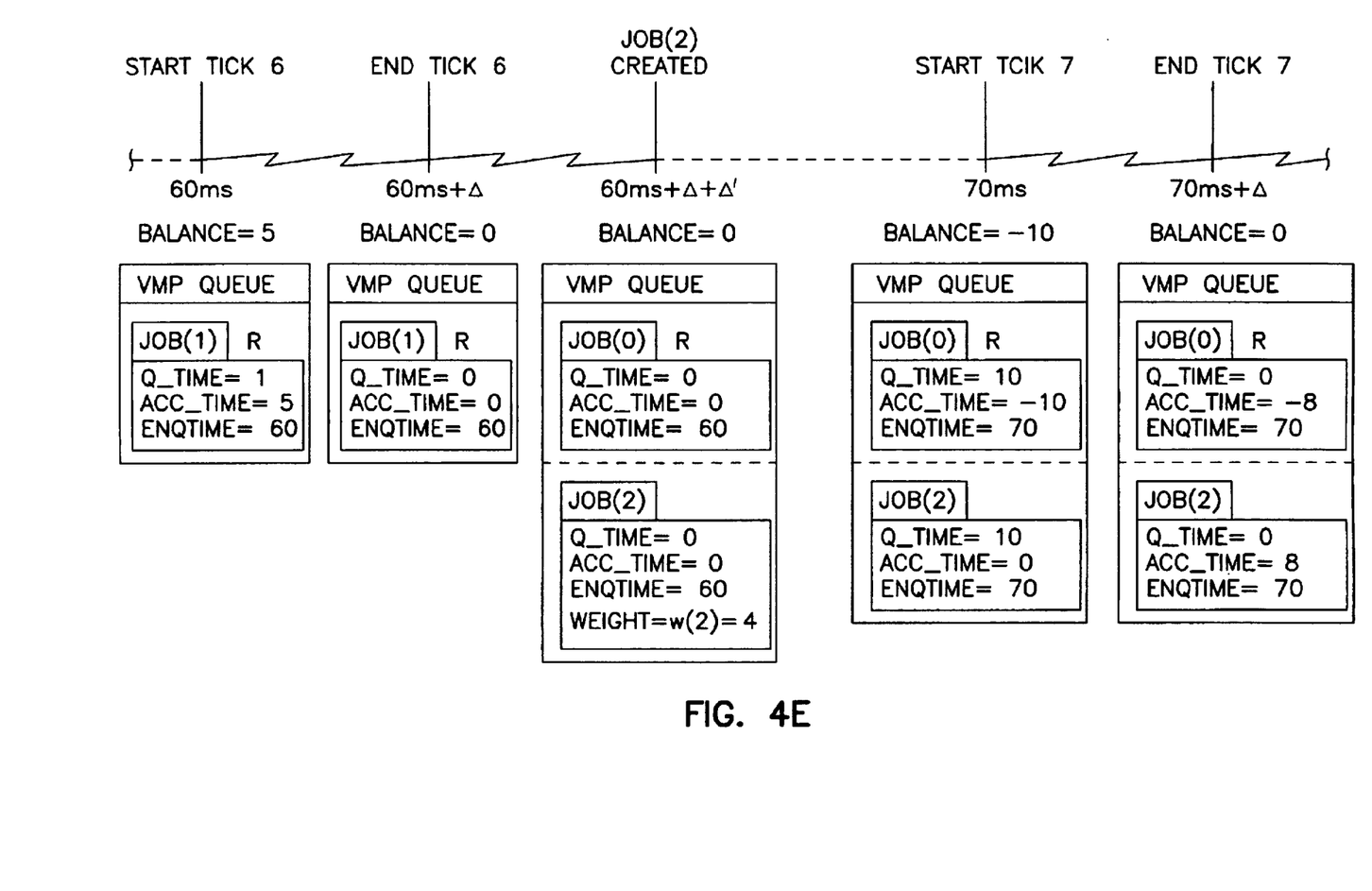

Also at time 60 mS+delta, at the end of Scheduler Tick 6, the Time Slice, which began at 30 mS when job(1) was placed on the CPU, ends 30 mS after the beginning of the Time Slice. At the end of the Time Slice, job(1) is the only job in VMP queue, and is therefore, selected to run on the CPU.

At time 60 mS+Delta+Delta, slightly after the end of Scheduler Tick 6, a new job(2) structure is created and placed on the VMP. At time this time, the VMP Balance=0 mS, and the job(1) variable values remain at: queue_time=0 mS; accumulated_time=0 mS; and enqueue_time=60 mS. The newly created job(2) enters on the VMP Queue with the following variable values in the VMP queue: queue_time=0 mS; accumulated_time=0 mS; enqueue_time=60 mS; and weight w(2)=4.

At the start of Scheduler Tick 7, at time 70 mS, the VMP Balance=–10 mS. The job(1) variable values are: queue_time=10 mS; accumulated_time=–10 mS; and enqueue_time=70 mS. The job(2) variable values are: queue_time=10 mS; accumulated_time=0 mS; and enqueue_time=70 mS. At the end of the Scheduler Tick 7 slightly after time 70 mS, 2 mS of Earnings are apportioned to Job(1) and 8 mS of Earnings are apportioned to Job(2) based on the above Apportioning Equation I. As a result, at the end of Scheduler Tick 7, the VMP Balance=0 mS. The job(1) variable values are: queue_time=0 mS; accumulated_time=–8 mS; and enqueue_time=70 mS. The job(2) variable values are: queue_time=0 mS; accumulated_time=8 mS; and enqueue_time=70 mS.

CONCLUSION

The earning-based time-share scheduler of the present invention uses time allocation as its fundamental mechanism for determining which processors to run in a competitive situation. All priorities are non-degrading. Thus, in the time-sharing band, the priorities are a precise indication of the rate at which processes accumulate CPU time relative to each other. The rate with which a schedulable job accumulates time is independent of its internal structure, whether it's a single-threaded process, a multi-threaded process, or a gang of sprocs. The earning-based scheduler implements a space-sharing earnings-based policy where the priorities of time-sharing processes indicate the rate at which CPU time is accumulated. Processes with high earnings are scheduled ahead of processes with lower earnings and charged for their usage on the CPU when the usage occurs. The earnings value reflects how much CPU time a particular process has earned, by virtue of waiting on a busy run queue. The earnings increase as long as a process is runnable, and decrease whenever the process runs on the CPU. Therefore, the earning-based algorithm of the present invention provides long-term stability to the scheduling policy by assuring that the process get a fixed share of the CPU over time.

As a result of the long-term stability of the earning-based time-share scheduling algorithm, the scheduler has considerable leeway in short-term scheduling decisions. For example, many factors or conditions other than earnings of a job are taken into account when selecting a process to run on the CPU, such as cache affinity, memory affinity, and interactive response. While such short-term decisions may prevent a process from being run, the short-term decisions do not affect a job's time-accumulation rate, which eventually dominates and forces the scheduler to give the process its fair share of the CPU. Therefore, the earning-based time-share scheduling mechanism of the present invention permits considerable flexibility in short-term scheduling decisions in order to improve throughput or response time, while maintaining fairness over the long term.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of time-share scheduling a plurality of jobs in a computer system operating across a plurality of time segments, the method comprising the steps of:

apportioning, during each time segment, earnings to each of the jobs based on time each job spent in a queue requesting execution on a processor in the computer system during the time segment, wherein apportioning earnings includes reducing earnings as a function of time each job ran on the processor during the time segment;

adding a number to accumulated earnings for each job as a function of earnings apportioned to each job during the time segment;

selecting a job for execution on the processor as a function of accumulated earnings for each of the jobs.

2. The method of claim 1 wherein time segments are marked by scheduler ticks and wherein the apportioning step includes the step of:

allocating, at scheduler ticks, earnings to each job based on time each of the jobs spent in a queue requesting execution on a processor in the computer system.

3. The method of claim 1 wherein reducing earnings includes the step of:

subtracting earnings from at least one of the jobs as a weighted function of time the job spent running on the processor.

4. The method of claim 1 wherein the apportioning step includes the step of:

allocating earnings to each of the jobs proportional to priority weights assigned to each of the jobs.

5. The method of claim 1, wherein time segments are marked by scheduler ticks and wherein the apportioning step includes:

calculating, at scheduler ticks, a balance representing an amount of time available for running jobs in the processor over a previous period between scheduler ticks; and allocating, at scheduler ticks, earnings to each of the jobs based on the calculated balance and time each of the jobs spent in a queue requesting execution on a processor in the computer system over the previous period between scheduler ticks.

6. The method of claim 5 wherein the allocating step includes allocating, at scheduler ticks, earnings to each of the jobs proportional to priority weights assigned to each job.

7. The method of claim 5 wherein each of the jobs is assigned a priority weight and wherein the allocating step includes allocating earnings to a given job of the plurality of jobs as a function of the balance multiplied by the given job's time spent in a queue requesting execution on a processor in the computer system over a previous period between scheduler ticks multiplied by the given job's priority weight divided by the summation of all of the time the plurality of jobs spent in a queue requesting execution on a processor in the computer system over a previous period between scheduler ticks multiplied by the their corresponding priority weights.

8. The method of claim 5 wherein the calculating step includes calculating the balance, at the start of scheduler ticks, as the summation of all total earnings of the plurality of jobs.

9. The method of claim 8 the allocating step includes allocating earnings, at the end of scheduler ticks, based on the calculated balance such that at the end of each scheduler tick, after earnings are allocated to each of the plurality of jobs, the summation of all total earnings of the plurality of jobs is substantially equal to zero.

10. The method of claim 1 wherein earning are only apportioned in the apportioning step to jobs which are runnable on the processor.

11. The method of claim 1 wherein earnings are apportioned in the apportioning steps to all of the jobs even if some of the jobs are not runnable on the processor.

12. The method of claim 1 wherein the apportioning step includes the step of limiting the earnings of each of the jobs to a maximum earnings value.

13. The method of claim 1 further comprising the step of scheduling a selected job for execution on the processor based on conditions other than the selected jobs earnings.

14. The method of claim 13 wherein the earnings are not altered to schedule the selected job, but are decreased as the job runs on the processor.

15. The method of claim 13 wherein the conditions include cache affinity of the selected job.

16. The method of claim 13 wherein the conditions include memory affinity of the selected job.

17. The method of claim 13 wherein the conditions include interactive response of the selected job.

18. A computer system comprising:

a processor for running a plurality of jobs, which time-share the processor;

apportioning means for, during each of a plurality of time segments, apportioning earnings to each of the plurality of jobs based on time each of the jobs spent in a queue requesting execution on the processor during the time segments and based on time each of the jobs ran on the processor during the time segment;

accumulating means for adding a number to accumulated earnings for each job and as a function of earnings apportioned to each job during the time segment;

selecting means for selecting a job for execution on the processor as a function of accumulated earnings for each of the job.

19. The computer system of claim 18, wherein time segments are marked by scheduler ticks and wherein the apportioning means includes means for allocating, at scheduler ticks, earnings to each of the jobs based on time each of the jobs spent in a queue requesting execution on the processor.

20. The computer system of claim 18 wherein the apportioning means includes the means for subtracting earnings from at least one of the jobs as that job runs on the processor.

21. The computer system of claim 18 wherein the apportioning means includes the means for allocating earnings to each of the jobs proportional to priority weights assigned to each of the jobs.

22. The computer system of claim 18, wherein time segments are marked by scheduler ticks and wherein the apportioning means includes:

means for calculating, at scheduler ticks, a balance representing an amount of time available for running jobs in the processor over a previous period between scheduler ticks; and means for allocating, at scheduler ticks, earnings to each of the jobs based on the calculated balance and time each of the jobs spent in a queue requesting execution on the processor over the previous period between scheduler ticks.

23. The computer system of claim 18 further comprising:
means for scheduling a selected job for execution on the processor based on conditions other than the selected jobs earnings.

24. The computer system of claim 23 wherein the conditions include cache affinity of the selected job.

25. The computer system of claim 23 wherein the conditions include memory affinity of the selected job.

26. The computer system of claim 23 wherein the conditions include interactive response of the selected job.

27. The computer system of claim 18 wherein the apportioning means and the selecting means comprise operating system software.

28. A machine-readable medium with instructions thereon for execution on a computer, the instructions operable when executed to cause the computer to:

apportion, during each time segment, earnings to each of the jobs based on time each job spent in a queue requesting execution on a processor in the computer system during the time segment, wherein apportioning earnings includes reducing earnings as a function of time each job ran on the processor during the time segment;

add a number to accumulated earnings for each job as a function of earnings apportioned to each job during the time segment; and select a job for execution on the processor as a function of accumulated earrings for each of the jobs.

29. The machine-readable medium of claim 28, wherein time segments are marked by scheduler ticks and wherein the instructions operable to apportion include program code for allocating, at scheduler ticks, earnings to each job based on time each of the jobs spent in a queue requesting execution on a processor in the computer system.

30. The machine-readable medium of claim 28, wherein reducing earnings includes:

subtracting earnings from at least one of the jobs as a weighted function of time the job spent running on the processor.

31. The machine-readable medium of claim 28, wherein:
the instructions operable to apportion include program code for allocating earnings to each of the jobs proportional to priority weights assigned to each of the jobs.

32. The machine-readable medium of claim 28, wherein time segments are marked by scheduler ticks and wherein the instructions operable to apportion include:

program code for calculating, at scheduler ticks, a balance representing an amount of time available for running jobs in the processor over a previous period between scheduler ticks; and program code for allocating, at scheduler ticks, earnings to each of the jobs based on the calculated balance and time each of the jobs spent in a queue requesting execution on a processor in the computer system over the previous period between scheduler ticks.

33. The machine-readable medium of claim 32, wherein the program code for allocating earnings includes program code for allocating, at scheduler ticks, earnings to each of the jobs proportional to priority weights assigned to each job.

34. The machine-readable medium of claim 32, wherein each of the jobs is assigned a priority weight and wherein the program code for the allocating step includes program code for allocating earnings to a given job of the plurality of jobs as a function of the balance multiplied by the given job's time spent in a queue requesting execution on a processor in the computer system over a previous period between scheduler ticks multiplied by the given job's priority weight divided by the summation of all of the time the plurality of jobs spent in a queue requesting execution on a processor in the computer system over a previous period between scheduler ticks multiplied by the their corresponding priority weights.

35. The machine-readable medium of claim 28, wherein the instructions for apportioning include program code for limiting the earnings of each of the jobs to a maximum earnings value.

36. The machine-readable medium with instructions thereon for execution on a computer of claim 28 wherein the instructions operable to select a job for execution include program code for selecting as a function of cache affinity of each of the jobs.

37. The machine-readable medium with instructions thereon for execution on a computer of claim 28 wherein the instructions operable to select a job for execution include program code for selecting as a function of conditions that include memory affinity of each of the jobs.

38. The machine-readable medium with instructions thereon for execution on a computer of claim 28 wherein instructions operable to select a job for execution include program code for selecting as a function of interactive respose requirements of each of the jobs.

* * * * *

UNITED STATES PATENT AND TRADEMARK OFFICE
CERTIFICATE OF CORRECTION

PATENT NO.    : 6,714,960 B1
DATED         : March 30, 2004
INVENTOR(S)   : Bitar et al.

It is certified that error appears in the above-identified patent and that said Letters Patent is hereby corrected as shown below:

Column 12,
Line 5, after "by" delete "the".
Line 11, after "claim 8" insert -- wherein --.

Column 14,
Line 30, after "by" delete "the".

Signed and Sealed this

Thirteenth Day of July, 2004

JON W. DUDAS
*Acting Director of the United States Patent and Trademark Office*